Figure 1:
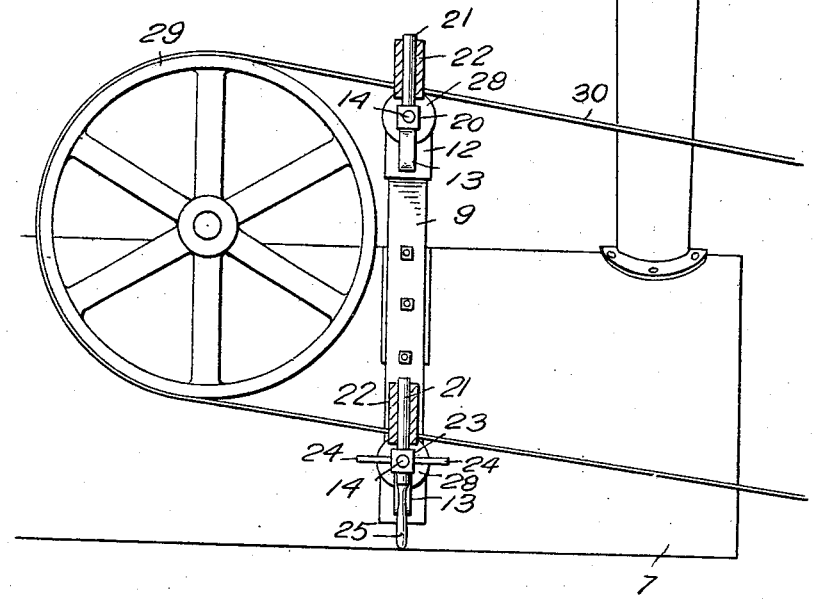

No. 869,899. PATENTED NOV. 5, 1907.
H. GROSS.
BELT GUIDE.
APPLICATION FILED JAN. 29, 1907.

2 SHEETS—SHEET 1.

Witnesses
G. R. Thomas
Fd. C. McCartney

Inventor
H. Gross

By Chandler & Chandler
Attorneys

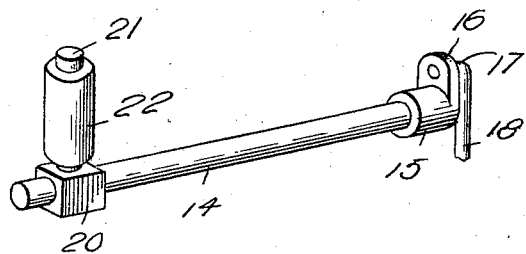
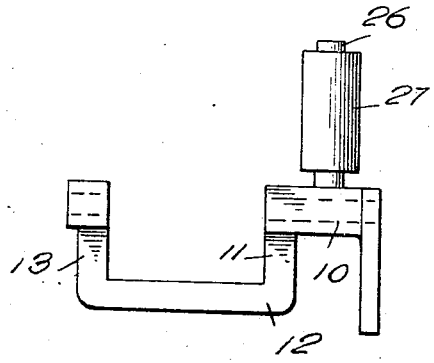
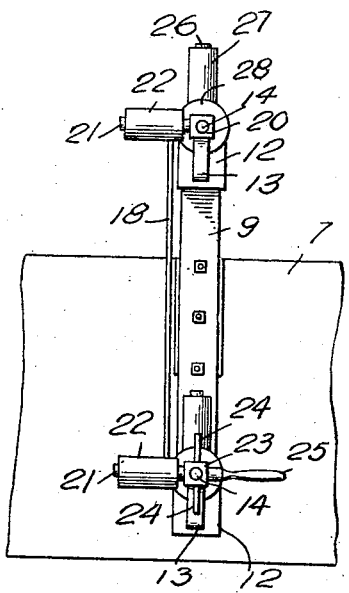

UNITED STATES PATENT OFFICE.

HERMAN GROSS, OF WEBSTER, SOUTH DAKOTA.

BELT-GUIDE.

No. 869,899.  Specification of Letters Patent.  Patented Nov. 5, 1907.

Application filed January 29, 1907. Serial No. 354,673.

*To all whom it may concern:*

Be it known that I, HERMAN GROSS, a citizen of the United States, residing at Webster, in the county of Day, State of South Dakota, have invented certain new and useful Improvements in Belt-Guides; and I do hereby declare the following to be a full, clear, and exact description of the invention, such as will enable others skilled in the art to which it appertains to make and use the same.

The present invention relates to improvements in belt guides, and it aims to provide a device adapted particularly for attachment to a traction engine, to prevent any displacement of the drive belt which passes around the fly wheel of the engine.

A further object of the invention resides in the provision of a belt guide comprising upper and lower sets of guide rollers in which the outer roller of each set is radially mounted on a supporting shaft so as to be moved into and out of vertical position to enable the belt to be moved on to and off of the fly wheel.

With the above and other ends in view, the invention consists in the construction, combination, and arrangement of parts, all as hereinafter fully described, specifically claimed, and illustrated in the accompanying drawings, in which like parts are designated by corresponding reference numerals in the several views.

Figure 2:
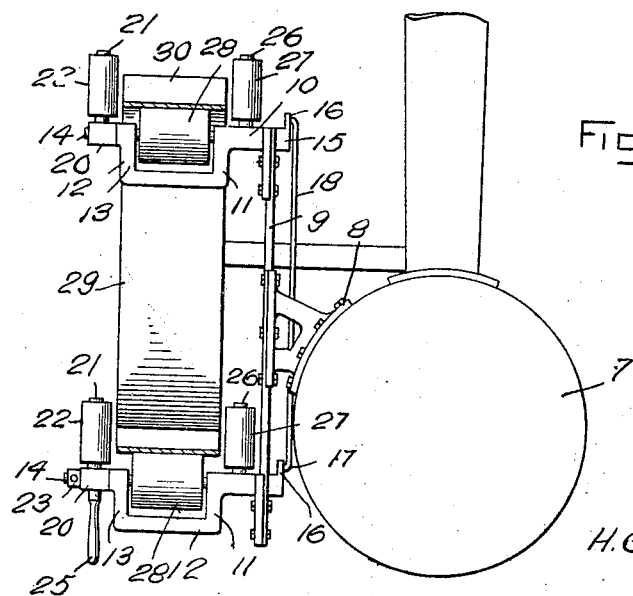

Of the said drawings—Figure 1 is a fragmental view in side elevation of a traction engine, showing the belt guide attached to the engine boiler, the movable rollers being shown in vertical position. Fig. 2 is a front elevation of Fig. 1. Fig. 3 is a detail perspective view of one of the roller supporting shafts, showing the sleeve and roller carried thereby on one end and the ear attached to the opposite end. Fig. 4 is an enlarged detail view of one of the supporting brackets. Fig. 5 is a detail view in side elevation showing the movable rollers in horizontal position.

Referring to the drawings, numeral 7 designates the boiler of a traction engine of any preferred type, to which a bracket 8 is bolted, this bracket carrying at its outer end a vertical metal rod 9, whose opposite ends are forked to straddle the laterally extended arms 10 of the upper and lower U-shaped brackets 12. The extended arms 10, which are formed on the inner legs 11 of the brackets, are bored axially, and the upper ends of the outer legs 13 of the brackets are likewise provided with openings in alinement with the bores of the extended arms.

Rotatably disposed in the bearings so formed in the brackets are the upper and lower shafts 14, each of which extends at opposite ends beyond the brackets, as shown in Fig. 2. The inner end of each shaft carries a sleeve 15 having a radially extending perforated ear 16, in which the bent end 17 of a connecting rod 18 is engaged. The outer end of each shaft 14 is in like manner provided with a sleeve 20 carrying a radial pin 21, upon which is revolubly mounted a roller 22. The lower sleeve 20 in addition to the pin and roller carries an actuating handle 25. It will therefore be apparent that when the handle is swung in one direction the lower shaft 14 will be partially rotated correspondingly, causing the roller 22 to assume a horizontal position, the connecting rod 18 between said shaft and the upper shaft effecting a similar movement of the latter and causing the roller carried thereby to likewise assume a horizontal position. When, however, the handle is swung in the opposite direction both rollers will be moved into vertical position. The lower shaft 14 is further provided with a nut 23 carrying a pair of handles 24, by means of which the nut is locked against the sleeve 20 when its roller is in its normal or vertical position, thereby preventing displacement of the latter.

The extended arm 10 of each bracket is likewise provided with a vertical pin 26, carrying a roller 27 loosely mounted thereon, and the shafts 14 are each provided with a roller 28, which is located between the legs 11 and 13 of the brackets 12.

As shown in Fig. 1, the bracket 8 which carries the rod 9 and its attendant parts is located slightly in advance of the fly-wheel 29 of the engine, around which the belt 30 passes, and the brackets 12 are so positioned upon rod 9 that their horizontal rollers 28 are in contact with the upper end lower stretches of the belt. It will therefore be apparent that when the movable rollers 22 carried by the shafts 14 have been moved into horizontal position, the belt may be readily shifted by any preferred mechanism onto the horizontal rollers 28, when the movable rollers will be returned to their vertical position. The belt will therefore be prevented from displacement from the fly-wheel, owing to the disposition of the stationary and movable vertical rollers on opposite sides thereof.

Owing to the provision of the connecting rod between the sleeves 15, it will be obvious that the movement of both rollers 22 will be simultaneous and the belt may therefore be readily moved onto and off of the horizontal rollers 28, as above described.

Further description of the invention and its operation is deemed unnecessary in view of the foregoing.

It is to be understood that modifications and changes may be made within the scope of the appended claims, as the invention is not intended to be limited to the exact details of construction shown and described.

What is claimed, is—

1. The combination, with an engine including a fly-wheel and a drive belt passing therearound, of a rod secured to the engine adjacent the fly-wheel; a bracket secured to each end of said rod; and a fixed guide and a movable guide carried by each bracket and arranged in spaced relation to each other, to permit the belt to pass therebetween.

2. The combination, with an engine including a fly-wheel and a drive belt passing therearound, of a rod secured to the engine adjacent the fly-wheel; a bracket secured to each end of said rod; a fixed guide and a movable guide carried by each bracket and arranged in spaced relation to each other, to permit the belt to pass therebetween; and means for shifting said movable guides simultaneously into and out of vertical position.

3. The combination, with an engine including a fly-wheel and a drive belt passing therearound, of a rod secured to the engine adjacent the fly-wheel; a bracket secured to each end of said rod; a stationary vertical guide attached to the inner end of each bracket; a swinging guide disposed at the outer end of each bracket; and means for moving said swinging brackets simultaneously into and out of vertical position.

4. The combination, with an engine, including a fly-wheel and a drive belt passing therearound, of a vertical rod secured to the engine adjacent the fly-wheel; a bracket secured to each end of said rod; a shaft carried by each bracket; a stationary vertical guide carried by each bracket; a guide carried by each shaft in spaced relation to the first-mentioned guides; means connecting said shafts; and means for operating said last-mentioned means to rock said shafts and shift the guides carried thereby into and out of vertical position.

5. The combination, with an engine, including a fly-wheel and a drive belt passing therearound, of a vertical rod secured to the engine adjacent the fly-wheel; a bracket secured to each end of said rod; a shaft carried by each bracket; a vertically extending pin carried by each bracket; a roller loosely mounted on each pin; a laterally projecting pin carried by each shaft and arranged in spaced relation to said bracket pin; a roller loosely mounted on each shaft pin; a roller carried by each bracket between the rollers mounted on said pins; means connecting said shafts; and means for operating said connecting means, to rock said shafts simultaneously and shift the rollers carried thereby into and out of vertical position.

6. The combination, with an engine including a fly-wheel and a drive belt passing therearound, of a vertical rod secured to the engine adjacent the fly-wheel; a pair of spaced guides carried by each end of said rod; and means for shifting the outer guides simultaneously into and out of vertical position.

7. The combination, with an engine including a fly-wheel and a drive belt passing therearound, of a vertical rod secured to the engine adjacent the fly-wheel; a pair of spaced guides carried by each end of said rod; a horizontal guide disposed between the members of each of said first mentioned pairs of guides; and means for simultaneously shifting the outer member of each of said pairs of guides into and out of vertical position.

8. The combination, with an engine including a fly-wheel and a drive belt passing therearound, of a vertical rod secured to the engine adjacent the fly-wheel; a pair of spaced guides carried by each end of said rod; a horizontal guide disposed between the members of each of said first mentioned pairs of guides; means connecting the outer members of said pairs of guides; and means for actuating said connecting means, to shift said outer guides simultaneously into and out of horizontal position.

In testimony whereof, I affix my signature, in presence of two witnesses.

HERMAN GROSS.

Witnesses:
PHILLIP A. GROSS,
J. V. MARTIN.